No. 858,317. PATENTED JUNE 25, 1907.
G. B. & J. H. YOUNG.
CORN POPPER.
APPLICATION FILED NOV. 30, 1906.

2 SHEETS—SHEET 1.

WITNESSES
Edw. Thorpe.

INVENTORS
George B. Young
Joseph H. Young
BY
ATTORNEYS

No. 858,317. PATENTED JUNE 25, 1907.
G. B. & J. H. YOUNG.
CORN POPPER.
APPLICATION FILED NOV. 30, 1906.

2 SHEETS—SHEET 2.

WITNESSES
Edw. Thorpe

INVENTORS
George B. Young
Joseph H. Young
BY Munn & Co
ATTORNEYS

UNITED STATES PATENT OFFICE.

GEORGE B. YOUNG AND JOSEPH H. YOUNG, OF EL PASO, TEXAS.

CORN-POPPER.

No. 858,317.   Specification of Letters Patent.   Patented June 25, 1907.

Application filed November 30, 1906. Serial No. 345,690.

*To all whom it may concern:*

Be it known that we, GEORGE B. YOUNG and JOSEPH H. YOUNG, both citizens of the United States, and residents of El Paso, in the county of El Paso and State of Texas, have invented a new and Improved Corn-Popper, of which the following is a full, clear, and exact description.

This invention is an improved device, especially designed for popping corn, although not limited to this particular use as it may be used advantageously in roasting peanuts and chestnuts and as a cooking device generally.

The object of the invention, primarily, is to provide for the cooking, roasting, etc. preferably by electrical means in a manner that the same may be carried out uniformly and also provide for the automatic release of the corn from the popper should the pan in which it is contained fill to the overflowing point.

Reference is to be had to the accompanying drawings forming a part of this specification, in which similar characters of reference indicate corresponding parts in all the figures.

Figure 1:
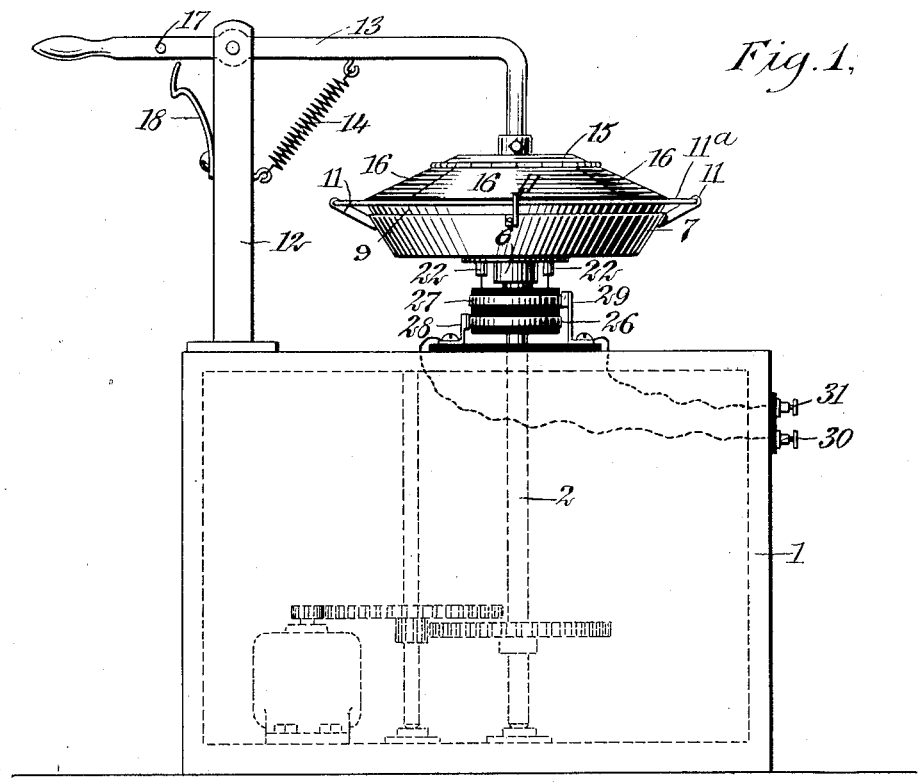
Figure 2:
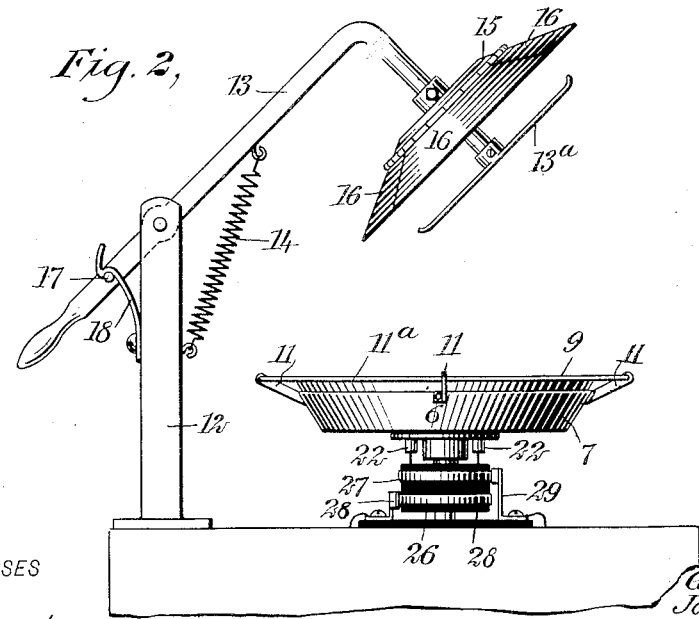
Figure 3:
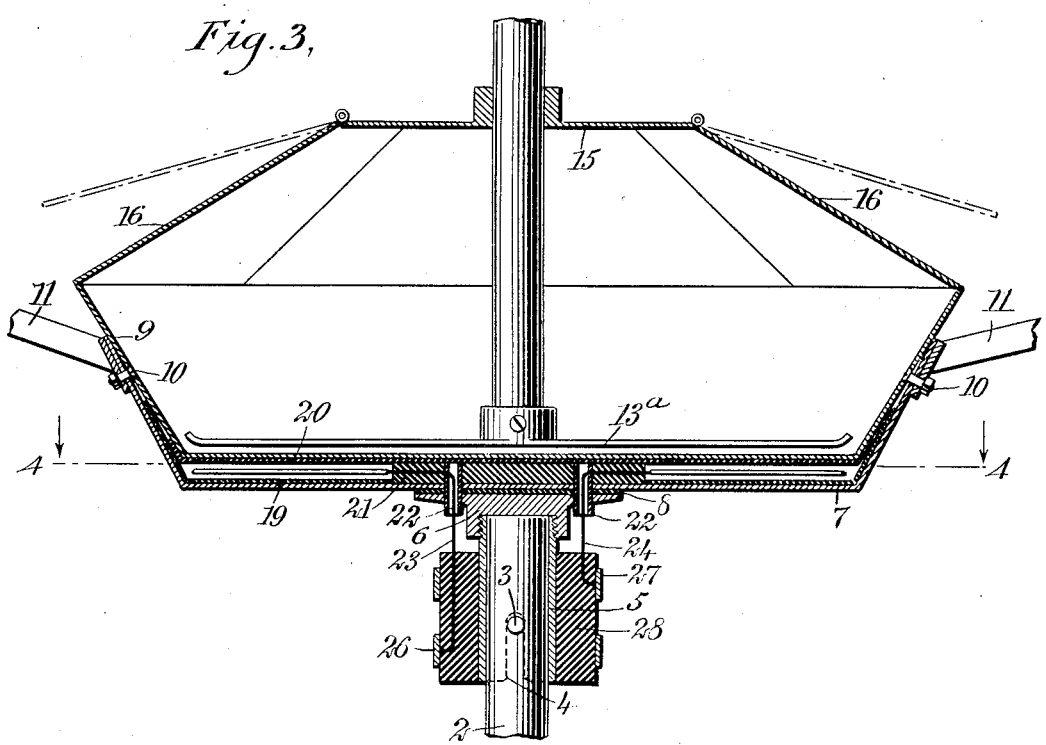
Figure 4:
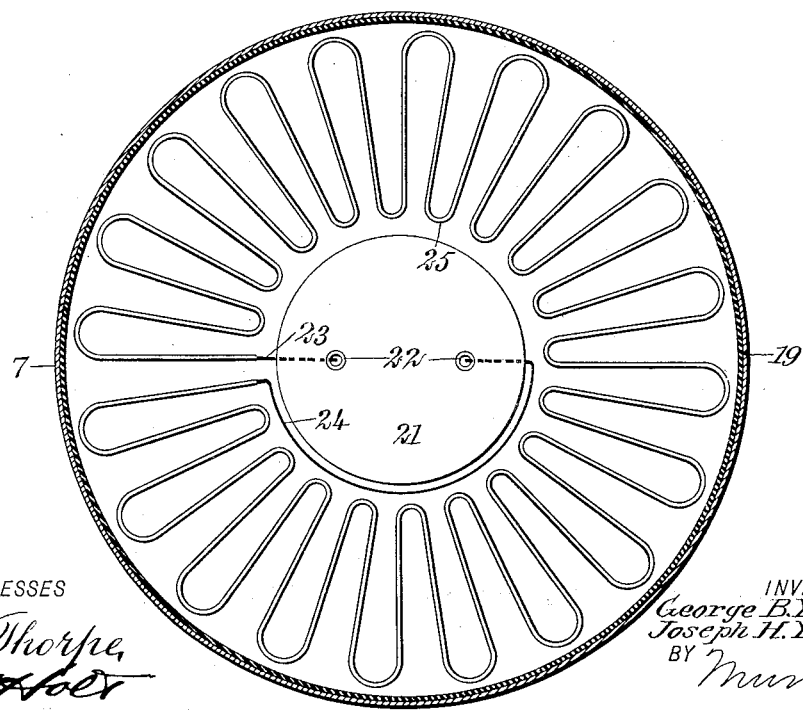

Figure 1 is a side elevation of one embodiment of our invention; Fig. 2 is a fragmentary view similar to Fig. 1, showing the pan and lid separated; Fig. 3 is a central, vertical section through the lid and pan, showing in dotted outline the position assumed by sectors of the lid as when the pan fills with corn to the overflowing point, and Fig. 4 is a horizontal section substantially on the line 4—4 of Fig. 3, looking in the direction of the arrow.

In carrying out the invention we employ a support 1, preferably in the nature of a box, in which is contained a motor intergeared with a vertical driving shaft 2, as shown in dotted outline in Fig. 1. This shaft 2, which is journaled in the support 1, projects a short distance above the top thereof, where it is provided with a transverse pin 3, adapted to engage in the slots 4 of a thimble 5, as shown in Fig. 3, holding said thimble against relative rotary movement on the shaft. The upper end of the thimble 5 is threaded into a center-plate 6, which is secured to the under face of a sheet metal cup 7, a sheet of material 8 being interposed between the plate and cup to insulate them from each other. Seated or telescoped within the cup 7 is a pan 9 of similar construction and forming with the cup a heating chamber therebetween for containing a suitable heating device hereinafter referred to. The pan and cup are both preferably constructed of aluminium and are rigidly secured together by screws or bolts 10 which also pass through brackets 11 arranged about the cup the latter, supporting a wire, 11$^a$ encircling the pan and forming a handle adapting both the cup and pan to be lifted from the end of the shaft 2 for emptying the pan or other purpose.

Fixed to the support 1 at one side of the shaft 2, is a standard 12, to the upper end of which is pivotally connected a hand-lever 13, normally forced in the direction of the pan by a spring 14 connecting the lever with the standard 12. The end of the lever 13 overhanging the pan 9 is downwardly-turned and has rigidly fixed thereto at its extremity an agitating device consisting of transverse arms 13$^a$ and also fixed thereabove a lid 15, which is preferably shaped as the frustum of a cone, with hingedly connected sectors 16, said sectors adapted to move outwardly to the dotted position shown in Fig. 3 should the pan become filled with popped corn to the overflowing point. For holding the lid 15 in an elevated position in order that access to the pan may be obtained, is provided a projection or pin 17 extending from the lever 13 at the opposite side of its pivotal connection, said pin being adapted to be engaged by a spring hook 18 carried by the standard 12, maintaining the lever and lid as illustrated in Fig. 2.

The compartment or chamber between the cup 7 and pan 9 is lined with a sheet insulating material 19 and 20, respectively, said material being preferably mica, as also a disk 21 arranged at the center of said chamber. This disk, as also the parts 6 and 8, are pierced by insulating nipples 22, through which pass conductors 23 and 24 leading to the terminal points of a heating coil 25 arranged in the compartment between the cup and pan. This coil, as shown in Fig. 4, which is preferably of German silver, is in the nature of a wire deeply corrugated and bent into the form of a ring. The conductors 23 and 24, as shown in Fig. 3, lead from contact rings 26 and 27, respectively, surrounding a cylinder 28 of wood or other insulating material, said cylinder being rigidly fixed to the thimble 5. The rings 26 and 27, when the pan is seated over the shaft 2, are engaged by brushes 28 and 29, respectively, the latter being coupled by suitable conductors to any source of electrical supply, through binding-posts 30 and 31.

It is obvious from the construction described that when the shaft 2 is caused to revolve, the pan and attached mechanism when engaged therewith, will be likewise driven. During this operation the coil 25 is heated from a suitable source of electrical supply, causing the cooking or roasting to take place uniformly throughout, through the action of the stirring or agitating device 13ª. If the material in the pan be popcorn, the corn, after popping, will remain in the pan until the same is filled to the overflowing point, after which it will raise the sectors 16 and permit the corn to fall from the pan.

Although we have described the preferred embodiment of the invention in detail, in order that the construction and operation might be fully understood, we regard the precise construction as not material and that the scope of the invention is limited by the scope of the annexed claims.

Having thus described our invention we claim as new and desire to secure by Letters Patent:

1. In a device of the character described, in combination, a vertical shaft, means for revolving said shaft, a cup removably connected with said shaft, a pan telescoped within the cup forming a heating chamber therebetween, electrical heating means within said chamber, and means connecting said heating means with a suitable source of electrical supply.

2. In a device of the character described, in combination, a cup, a pan telescoped within the cup providing a chamber therebetween, means rigidly connecting the pan and cup together, a resistance coil in said chamber, means for revolving the pan and cup, and means connecting the resistance coil with a suitable source of electrical supply.

3. In a device of the character described, in combination, a vertical shaft, means for revolving said shaft, a cup, a pan telescoped within the cup providing a chamber therebetween, a heating coil contained within the chamber, a thimble attached to the cup providing a socket for removably engaging the upper end of said shaft, an insulating cylinder surrounding the thimble, contact rings carried by the cylinder, conductors leading from said rings to the terminals of said heating coil, and brushes for engaging with said rings.

4. In a device of the character described, in combination, a pan having a heating chamber formed thereunder, electrical heating means within said chamber, and means for revolving the pan.

5. In a device of the character described, in combination, a pan having a heating chamber formed thereunder, electrically heating means within said chamber, a vertical shaft, means for revolving said shaft, and means for removably connecting the pan and shaft together.

6. In a device of the character described, in combination, a pan having a heating chamber formed thereunder, electrical heating means within said chamber, a vertical shaft, means for revolving said shaft, and a thimble providing a socket in fixed relation to the pan adapted to be passed over said shaft acting to detachably connect the pan thereto.

7. In a device of the character described, in combination, a pan having a heating chamber, a resistance coil within said chamber for heating the same, a revoluble shaft, a thimble providing a socket in fixed relation to the pan adapted to be removably connected to the shaft, and means fixed to said thimble connected with said coil adapted to feed the coil from a suitable source of electrical supply.

8. In a device of the character described, in combination, a pan having a heating chamber, a resistance coil, a revoluble shaft, a thimble providing a socket in fixed relation to the pan adapted to removably connect it with the shaft, an insulating cylinder surrounding the thimble, contact rings carried by the cylinder, conductors leading from said rings to the terminals of the resistance coil, and brushes engaging with said rings.

9. In a device of the character described, in combination, a pan having a heating chamber, insulating sheets lining said chamber, a heating coil within the chamber, revoluble means, means for detachably connecting the pan with said revoluble means, and contact rings and brushes for supplying said coil from a suitable source of electrical supply.

10. In a device of the character described, in combination, a pan having a heating chamber, electrical heating means within the chamber, revoluble means, means connecting said pan with said revoluble means, contact rings in fixed relation to the pan connected with the terminals of the electrical heating means, and brushes engaging said rings for feeding the heating means from a suitable source of electrical supply.

In testimony whereof we have signed our names to this specification in the presence of two subscribing witnesses.

GEORGE B. YOUNG.
JOSEPH H. YOUNG.

Witnesses:
W. S. SMALLWOOD,
C. S. PICKRELL.